W. C. CHAMBERLAIN.
Grain Separator.
No. 42,747. Patented May 17, 1864.
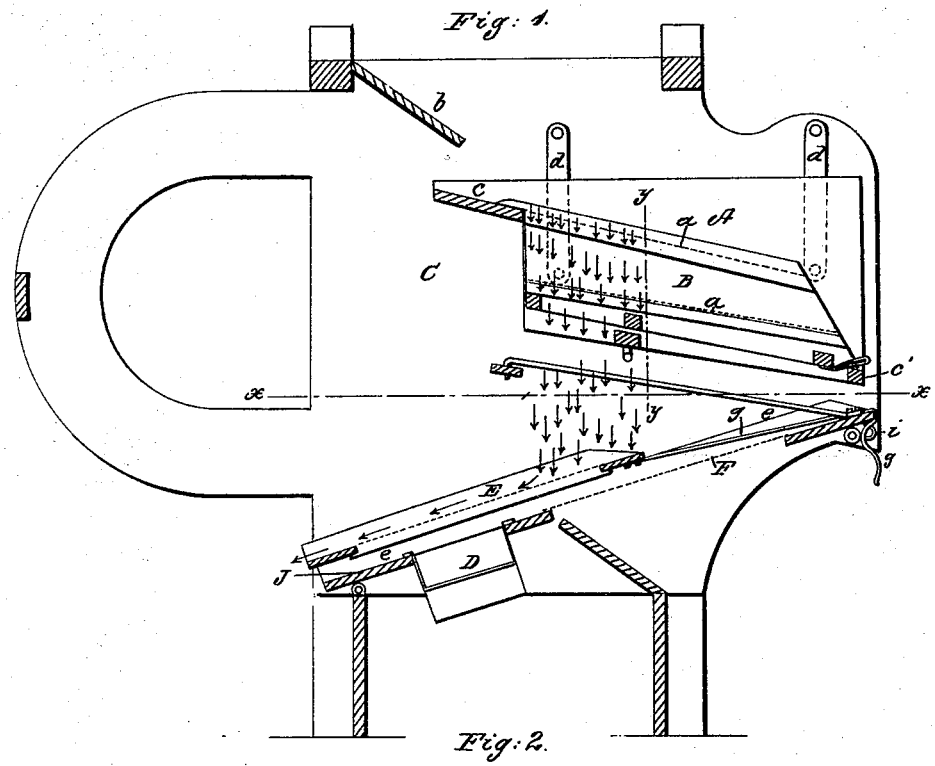
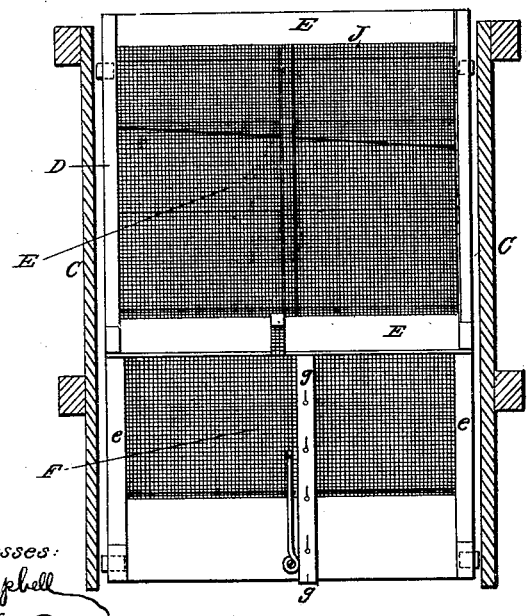
Witnesses:
R. T. Campbell
O. Schafer
Inventor:
W. C. Chamberlain

UNITED STATES PATENT OFFICE.

W. C. CHAMBERLAIN, OF DUBUQUE, IOWA.

IMPROVED GRAIN-SEPARATOR.

Specification forming part of Letters Patent No. 42,747, dated May 17, 1864.

*To all whom it may concern:*

Be it known that I, W. C. CHAMBERLAIN, of Dubuque, county of Dubuque, State of Iowa, have invented a new and useful Improvement in Fanning-Mills for Cleaning and Assorting Grain; and I do hereby declare that the following is a full, clear, and exact description thereof, reference being had to the accompanying drawings, making a part of this specification, in which—

Figure 1 is a vertical section, taken longitudinally through the center, of my improved fanning-mill. Fig. 2 is a section through the fanning-mill, taken in the horizontal plane indicated by the red lines $x$ $x$, Fig. 1.

Similar letters of reference indicate corresponding parts in the two figures.

In the operation of cleaning grain of seeds and other foreign substances mixed with it I have found that large quantities of nearly-clean grain pass from the hopper directly through the upper portions of the riddles or sieves, while the less clean grain escapes through the lower portions thereof; but as the point of separation is not absolute, it varying with different sorts of grain, and also according to the different conditions or qualities of the same kind of grain, in machines for cleaning grain hitherto used the assorted or cleaned grain is successively remixed with the partially-cleaned grain as long as the screening proceeds—*i. e.*, that portion of the grain which passes through the upper portions of the riddles is remixed with that portion which passes through the lower portion thereof, and, consequently, such machines do not assort the grain perfectly pure and clean.

The object of my invention is to separate the clean grain which falls directly through one portion of the riddling-shoe from the grain which is only partially cleaned that passes through the other portion of said shoe, and at the same time to adapt the machine to effect this result with all kinds and conditions of grain submitted to it, as will be hereinafter described.

To enable others skilled in the art to make and use my invention, I will proceed to describe its construction and operation.

The drawings represent only those portions of a fanning-mill which I deem necessary to illustrate my invention. The fan, and other parts not shown, may be constructed in the usual or any other suitable manner.

A represents a shoe containing the riddles or sieves $a$ $a$, upon which the grain falls from the inclined board $b$ after leaving the hopper, which latter I have not shown. The shoe A may be constructed and furnished with one or more sieves, like any shoe of a fanning or grain-cleaning machine, but in the drawings I have shown two sieves secured within a secondary shoe, B, which is supported at its ends within the shoe A by the inclined board $c$ and foot-brace $c'$. This shoe B can thus be adjusted and set at different inclinations, as may be required, or removed at pleasure. The pivoted suspenders $d$ $d$, two of which are applied to each side of the shoe A, support this shoe within the frame C of the machine in such manner that it is capable of receiving a lateral vibrating or shaking motion from any suitable prime motor through the medium of connecting rods and levers applied in the usual manner. Below this riddling-shoe A, I have arranged two inclined screens, E F, the lower one, F, of which extends from a point which is directly under the lower end of the shoe A, as shown in Fig. 1, down to a point directly under the upper end of said shoe, where it terminates in a laterally-inclined trough, D. The side strips, $e$ $e$, of this inclined screen extend from its upper end down to the opposite end of the frame C, and these strips are supported near their extreme ends upon anti-friction rollers, which allow the screen to be reciprocated in a direction with its length with very little friction.

The side strips, $e$ $e$, of the screen F project above its surface a suitable distance to form rails for supporting each side of the longitudinally-adjustable screen or assorter E, as shown in Figs. 1 and 2, which is attached to the lower or supporting screen by means of a strap, $g$, or other conveniently-adjusting device. When a simple strap, $g$, is used, it is attached at the upper end of the frame of the screen F by a button, $i$, and thus the screen E is held at the desired point under the upper portion of the shoe A. These two screens are used to assort the grain which falls upon them, the upper screen, E, receiving the clean grain, which falls unobstructedly or directly through the riddles of the shoe A, as indicated by the red arrows in Fig. 1, and discharging it at its lower end into a suitable receptacle, and the lower screen, F, receiving the partially-cleaned grain, which passes through the riddles and falls outside of the area of the upper screen, E, and discharging it into the transverse trough D after separating the fine seed, &c., from it.

It will be seen from the above description that I receive the grain falling through the sieves or riddles of shoe A upon two separate and distinct screens, so arranged that all that portion of the grain, which first escapes through the riddles, and which is found to be nearly clean, will be received, further cleaned, and conducted off by the sieve E, which is so applied that it can be adjusted more or less under the shoe A, according to the quality of the grain which it is intended to receive, and all that portion of the grain which is longer subjected to the riddling operation and, consequently, more or less mixed with foreign substances, will fall upon the lower screen, where it will be subjected to the shaking and cleaning action of this screen, and finally discharged into the trough D under the screen E.

To illustrate the operation of my invention more fully, I have drawn a red line, $y\,y$, through the riddles of Fig. 1. Now, in winnowing and cleaning a certain kind or quality of grain, we will suppose that the grain falling through the riddles of the shoe on the left of this line is quite clean, while that which escapes through the riddles on the right of this line is more or less mixed with foreign substances. That portion of grain which falls to the left of line $y\,y$ will be received on the screen E and further cleaned and conducted into a receptacle, while that which falls to the right of this line will be conducted into another receptacle, thus assorting the two qualities. But we will suppose that another kind or quality of grain is to be cleaned in the machine which will not pass through the sieves as freely. In this case the line $y\,y$, or point of separation, would be represented nearer to the upper end of the shoe—i. e., nearer to the hopper—because the chaff, seeds, &c., will commence to pass through the sieves sooner than it did in the former instance. Therefore it is necessary to adjust the screen E so that the unclean grain will fall upon the screen F, while the clean grain will fall upon the screen E. This adjustment of the screen E to the proper position under the shoe A enables the operator to make a more perfect separation of the cleaned from the partially-cleaned grain, of which there is always more or less. As the point of separation is not fixed or absolute, for the reasons above given, it is necessary to make the screen E adjustable and also to provide for any amount of adjustment required.

The screen E may be moved so as to expose very little of the surface of screen F, in which case the grain from this screen E will fall upon the inclined board J at the foot of the screen F and be discharged therefrom.

What I claim as my invention, and desire to secure by Letters Patent, is—

1. Attaching the two screens E F together by means of an adjusting-strap, $g$, or its equivalent, so applied as to admit of the ready adjustment of the screen E to adapt the machine for cleaning grain of different kinds and qualities, substantially as herein described.

2. The combination of the two united sieves E F with the riddles or sieves of a grain-cleaning machine, and with the receiving-trough D and auxiliary discharging-board J, substantially in the manner and for the purpose described.

3. The arrangement of the three screening devices $a$ E F in a separating-machine in the relation to each other, substantially as described and represented, and at the same time providing for the adjustment of the device E, so that the separating and assorting of the clean and partially-cleaned grain may be effected, as set forth.

W. C. CHAMBERLAIN.

Witnesses:
   E. C. DOOLITTLE,
   E. T. HEALEY.